United States Patent
Kawara

(10) Patent No.: US 9,613,057 B2
(45) Date of Patent: Apr. 4, 2017

(54) DOCUMENT MANAGEMENT APPARATUS, METHOD FOR CONTROLLING THE SAME, AND STORAGE MEDIUM

(71) Applicant: CANON KABUSHIKI KAISHA, Tokyo (JP)

(72) Inventor: Satoshi Kawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 13/959,192

(22) Filed: Aug. 5, 2013

(65) Prior Publication Data
US 2014/0059072 A1    Feb. 27, 2014

(30) Foreign Application Priority Data
Aug. 24, 2012 (JP) .................. 2012-185764

(51) Int. Cl.
*G06F 17/30* (2006.01)

(52) U.S. Cl.
CPC .. *G06F 17/30244* (2013.01); *G06F 17/30011* (2013.01)

(58) Field of Classification Search
CPC ......... G06F 17/30424; G06F 17/30864; G06F 17/30477; G06F 17/30244; G06F 17/30011
See application file for complete search history.

(56) References Cited

U.S. PATENT DOCUMENTS

| | | | |
|---|---|---|---|
| 5,829,044 A * | 10/1998 | Sono ............... | G11B 27/031 707/E17.028 |
| 7,684,069 B2 * | 3/2010 | Kashiwazaki ........... | 358/1.15 |
| 2003/0041045 A1 * | 2/2003 | Sun ................. | H04M 3/4228 |
| 2005/0111053 A1 * | 5/2005 | Yoshida et al. ............. | 358/448 |
| 2005/0144469 A1 * | 6/2005 | Saitoh .............. | G06F 21/608 713/189 |
| 2008/0086511 A1 * | 4/2008 | Takao .............. | G06F 17/30265 |
| 2009/0228599 A1 * | 9/2009 | Anglin ............. | G06F 3/0608 709/231 |
| 2009/0283583 A1 * | 11/2009 | Cowburn ........... | G06Q 10/087 235/375 |
| 2010/0046038 A1 * | 2/2010 | Matsuda et al. ............ | 358/434 |
| 2012/0124307 A1 * | 5/2012 | Ashutosh .......... | G06F 11/1451 711/162 |

FOREIGN PATENT DOCUMENTS

| | | |
|---|---|---|
| JP | A 2001-256256 | 9/2001 |
| JP | A 2004-220424 | 8/2004 |

* cited by examiner

*Primary Examiner* — Cam-Y Truong
(74) *Attorney, Agent, or Firm* — Fitzpatrick, Cella, Harper & Scinto

(57) ABSTRACT

A document management apparatus receives image data generated by a first user using an image processing apparatus, stores the image data, receives a document file that enables image data to be edited and was transmitted by a second user from a user terminal, searches for image data corresponding to the received document file among the stored image data, and transmits the received document file to an unique destination assigned to the first user who has generated the found image data.

5 Claims, 10 Drawing Sheets

DOCUMENT MANAGEMENT APPARATUS, METHOD FOR CONTROLLING THE SAME, AND STORAGE MEDIUM

BACKGROUND OF THE INVENTION

Field of the Invention

The present invention relates to a document management apparatus, a method for controlling the same, and a storage medium.

Description of the Related Art

In recent years, image processing apparatuses typified by multi-function peripherals (MFPs) are improving and increasing in functionality. An image processing apparatus has been developed that has not only basic functions, such as a scan function and a print function, that involve digitization and printing of paper documents but also a network interface (hereinafter abbreviated as network I/F). The image processing apparatus that has a network I/F cooperates with external systems and external services that are connected to the image processing apparatus by a network, and provides various solutions.

For example, the image processing apparatus that has a network I/F is capable of transmitting electronic data generated by scanning a paper document to a document management server configured in a server or the like, and storing the electronic data in the document management server (hereinafter referred to as "scanning and uploading"). Also, the electronic data can be attached to e-mail and transmitted to a desired recipient. However, electronic data generated by scanning and uploading is often generally data containing image data in various general-purpose formats such as portable document format (PDF). Such electronic data is not suitable for editing operations as compared with electronic data in a word processor format, a spreadsheet software format, or the like. Accordingly, on the document system side, there is conventionally a technology for analyzing electronic data that was scanned and uploaded, searching the document management server for the same electronic data (hereinafter referred to as original electronic data), and notifying a user who has executed the scanning and uploading of the search result (and further providing the original electronic data itself). According to this technology, it is possible to provide electronic data that is more suitable for editing to the user who has executed the scanning and uploading, resulting in an improvement in user convenience (see, for example, Japanese Patent Laid-Open Nos. 2001-256256 and 2004-220424).

According to the conventional technology, if the same electronic data (original electronic data) is registered in the document management server at the time of scanning and uploading, an original document file can be found. However, there may be cases where original electronic data is registered into the document management system after scanning and uploading. Even in such a case, the user who has executed the scanning and uploading may want to obtain the original electronic data, but the conventional technology cannot meet this need.

SUMMARY OF THE INVENTION

The present invention enables realization of a mechanism capable of, even if image data is generated and then a document file in which the image data can be edited is registered, providing the document file to a user.

One aspect of the present invention provides a document management apparatus comprising: an image data reception unit configured to receive image data generated in an image processing apparatus; a storage unit configured to store the image data; a document file reception unit configured to receive a document file transmitted from a user terminal; and a first search unit configured to search for image data corresponding to the received document file among the stored image data.

Another aspect of the present invention provides a method for controlling a document management apparatus, comprising: receiving image data generated in an image processing apparatus; storing the image data in a storage unit; receiving a document file transmitted from a user terminal; and searching for image data corresponding to the received document file among the stored image data.

Still another aspect of the present invention provides a non-transitory computer-readable storage medium storing a computer program for causing a computer to function as the units included in the document management apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

1. Overall System Configuration

Figure 1:
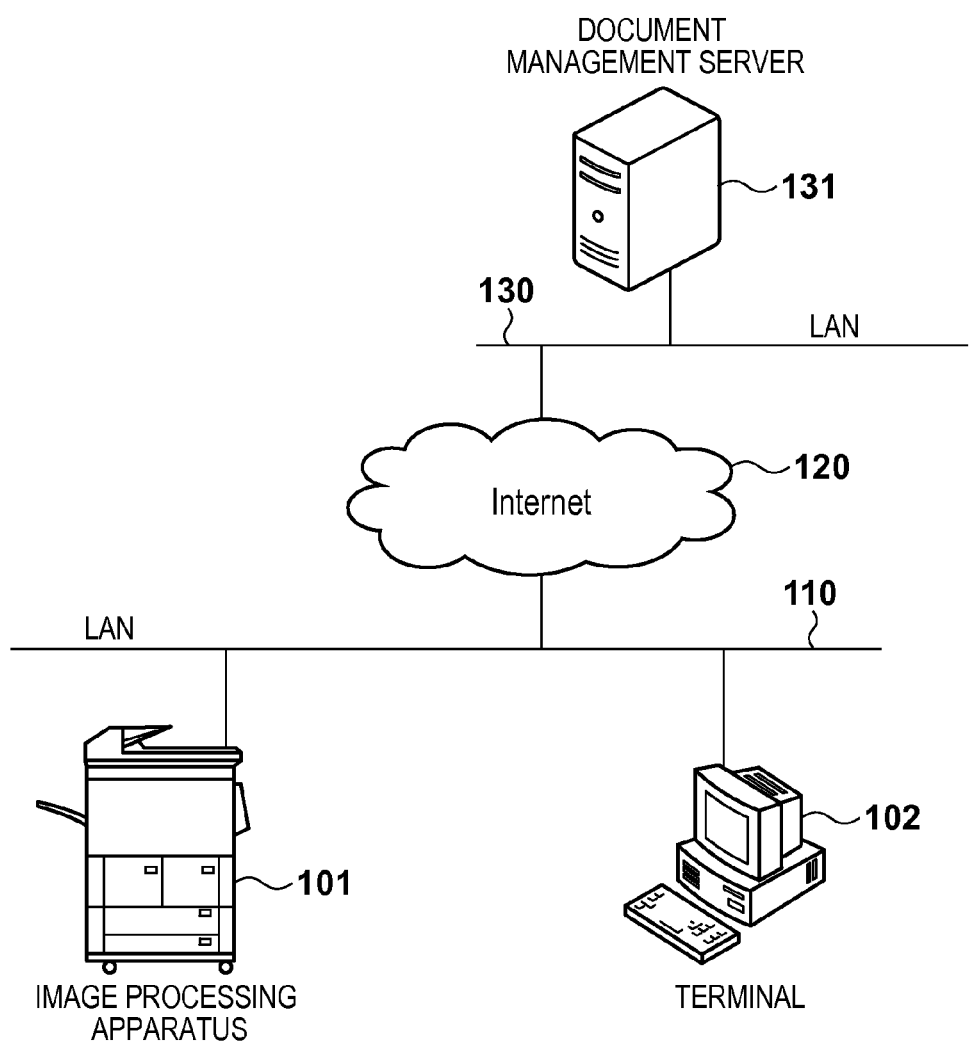
FIG. 1 is an overall view of a document management system according to an embodiment of the present invention.

Hereinafter, an overall view of a document management system according to the present embodiment is described with reference to FIG. 1. An image processing apparatus 101 and a terminal 102 (user terminal) are communicatively connected to a LAN 110. Also, the LAN 110 is connected to Internet 120. A document management server 131 is connected to a LAN 130. Also, the LAN 130 is communicatively connected to the Internet 120. Therefore, the image processing apparatus 101 and the terminal 102 are also connected to the document management server 131 that provides document management services via the Internet 120. Note that the present invention is not limited to this configuration, and it is sufficient that the image processing apparatus 101 and the terminal 102 are connectable to the document management server 131.

2. Image Processing Apparatus Configuration

Figure 2:
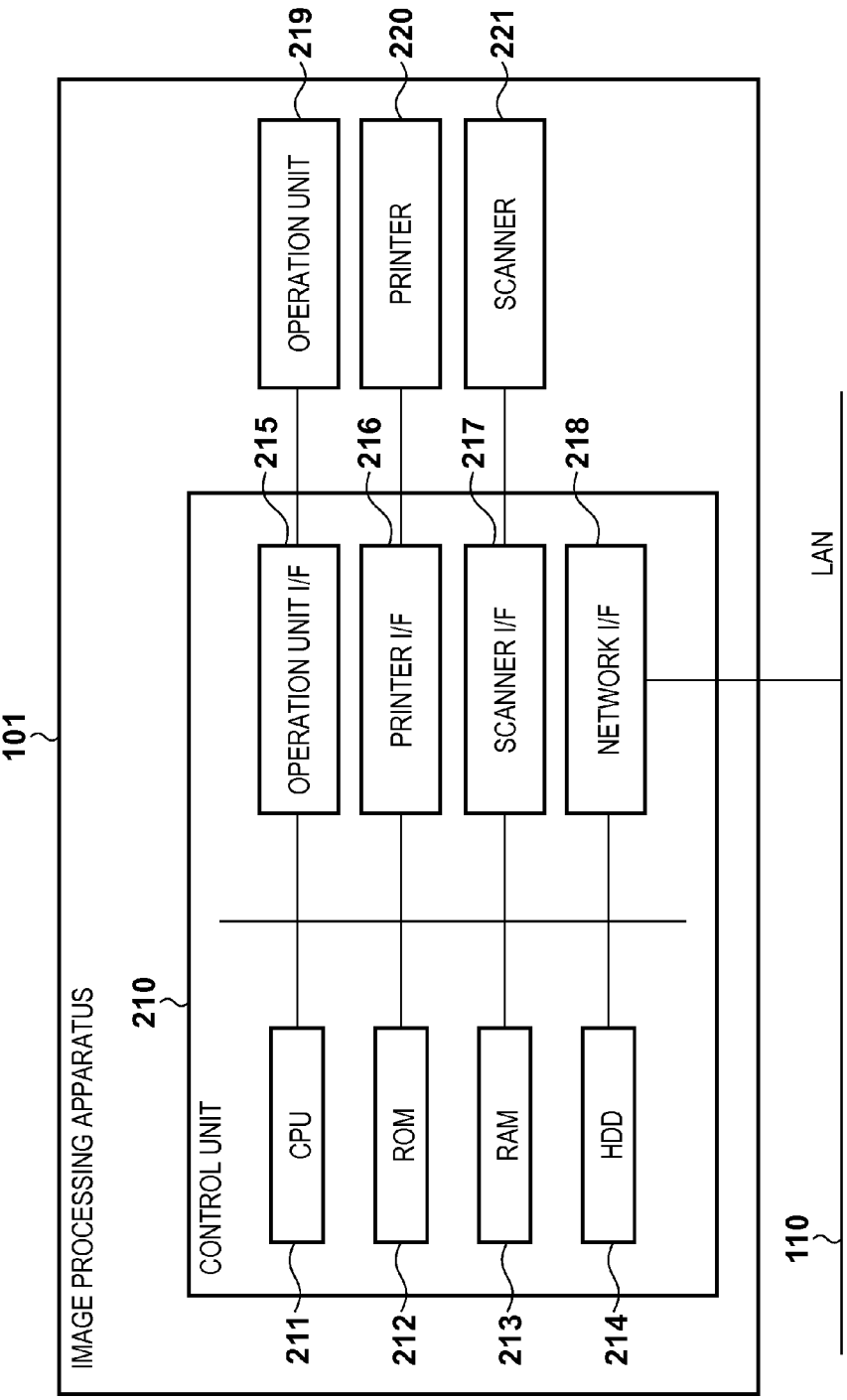
FIG. 2 is a block diagram illustrating an example of a configuration of an image processing apparatus.

Next, an example of a configuration of the image processing apparatus 101 is described with reference to FIG. 2. The image processing apparatus 101 is provided with a control unit 210, an operation unit 219, a printer 220, and a scanner 221. The control unit 210 includes a CPU 211, a ROM 212, a RAM 213, an HDD 214, an operation unit I/F 215, a printer I/F 216, a scanner I/F 217, and a network I/F 218, and controls overall operation of the image processing apparatus 101.

The CPU 211 reads out a control program stored in the ROM 212, and executes various types of control such as reading control and transmission control. The RAM 213 is used as a temporary storage region, such as a main memory or a work area of the CPU 211. The HDD 214 stores image data, various types of programs, or various types of information tables.

The operation unit 219 is provided with a liquid crystal display unit having a touch panel function, a keyboard, or the like. When a user operates the operation unit 219, a signal is input to the control unit 210 via the operation unit I/F 215. The printer 220 forms an image on a recording medium based on input image data. The image data is generated in the control unit 210, and is input to the printer 220 via the printer I/F 216. The scanner 221 reads an image on a document, generates image data, and transmits the image data to the control unit via the scanner I/F 217. The network I/F 218 functions to transmit information such as image data from the control unit 210 to an external apparatus (for example, the document management server 131) that is connected to the LAN 110, and to receive transmission of various types of information from the external apparatus to the control unit 210.

3. Document Management Server Configuration

Figure 3:
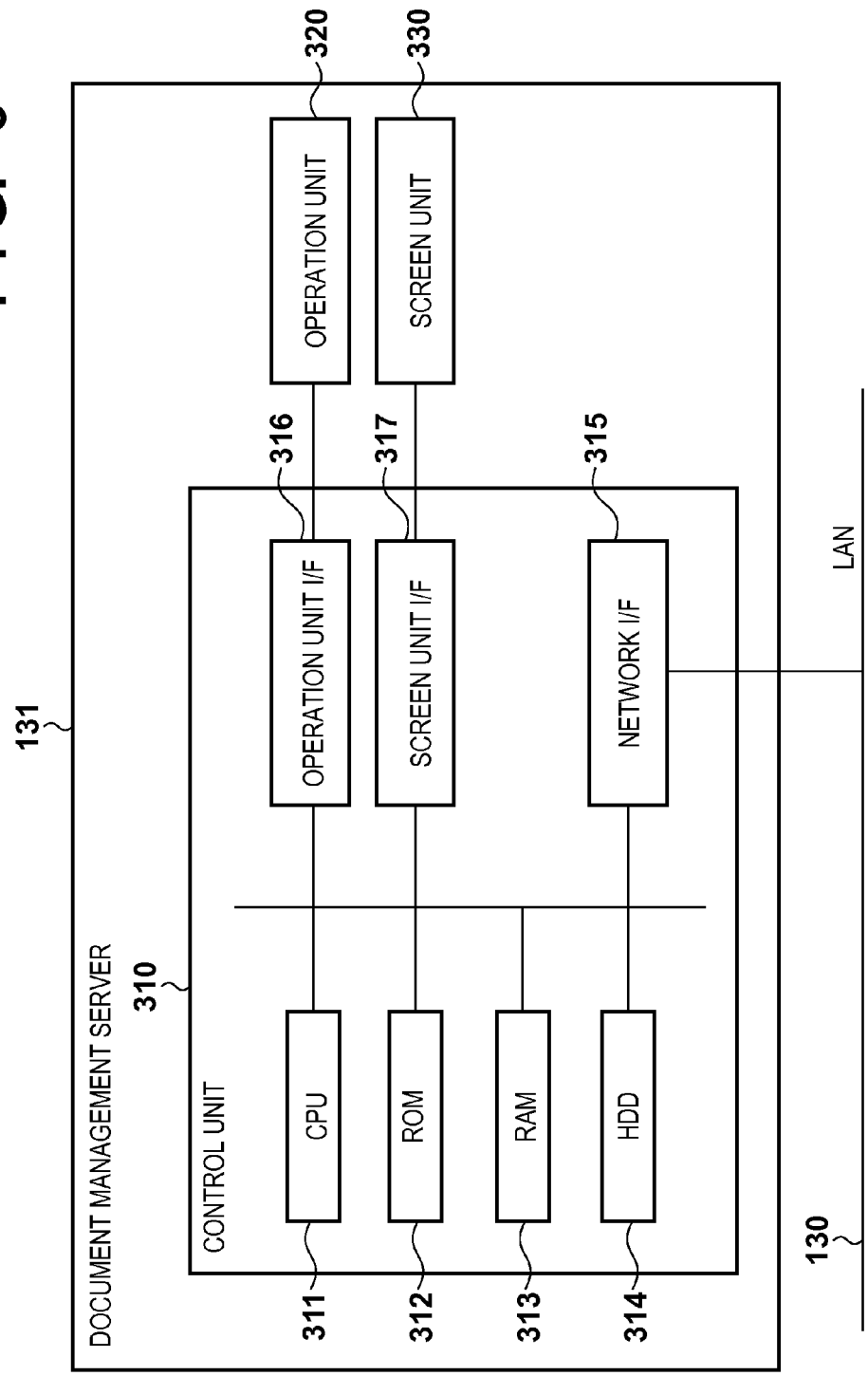
FIG. 3 is a block diagram illustrating an example of a configuration of a document management server.

Next, an example of a configuration of the document management server 131 is described with reference to FIG. 3. The document management server 131 is provided with a control unit 310, an operation unit 320, and a screen unit 330. The control unit 310 includes a CPU 311, a ROM 312, a RAM 313, an HDD 314, a network I/F 315, an operation unit I/F 316, and a screen unit I/F 317, and controls overall operation of the document management server 131.

The CPU 311 reads out a control program stored in the ROM 312, and executes various types of control processing. The RAM 313 is used as a temporary storage region, such as a main memory or a work area of the CPU 311. The HDD 314 stores image data, various types of programs, or various types of information tables that will be described later.

The network I/F 315 functions to transmit and receive various types of information, such as to receive image data, between the control unit 310 (the document management server 131) and an external apparatus connected to the LAN 110 via the Internet 120. The operation unit 320 is provided with a mouse pointer, a keyboard, or the like. When a user operates the operation unit 320, a signal is input to the control unit 310 via the operation unit I/F 316. The screen unit 330 includes a display device such as a liquid crystal screen, and information generated in the control unit 310 is output to the screen unit 330 via the screen unit I/F 317. Note that the terminal 102 has a similar configuration to that of the document management server 131 described in FIG. 3.

4. Software Configuration of Image Processing Apparatus

Figure 4:
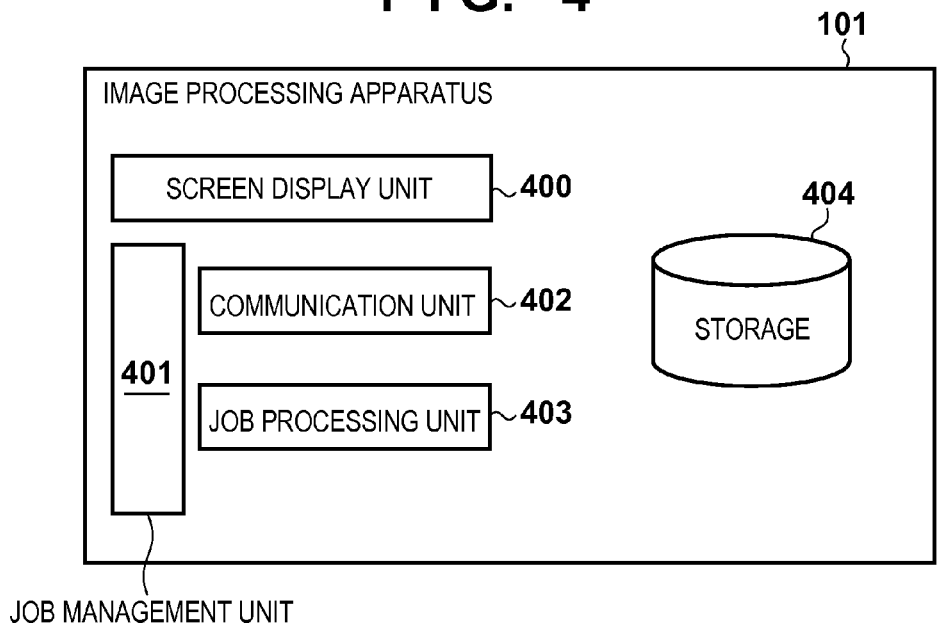
FIG. 4 is a diagram illustrating a software configuration of the image processing apparatus.

Next, a software configuration of the image processing apparatus 101 is described with reference to FIG. 4. Functional units illustrated in FIG. 4 are realized by the CPU 211 of each image processing apparatus 101 executing the control program. The image processing apparatus 101 includes a screen display unit 400, a job management unit 401, a communication unit 402, a job processing unit 403, and a storage 404. The screen display unit 400 displays, on the operation unit 219, an input screen for executing a scan operation, receives input from a user, and performs scanning and uploading, and the like with respect to the job management unit 401. The screen display unit 400 also displays the results of various types of processing.

The job management unit 401 controls the job processing unit 403 and the communication unit 402 so as to execute jobs. In response to the scanning and uploading from the screen display unit 400, the job management unit 401 instructs the job processing unit 403 to execute scanning, and instructs the communication unit 402 to communicate with the document management server 131. Also, in response to a printing execution request from the document management server 131, the job management unit 401 instructs the job processing unit 403 to execute printing.

The communication unit 402 transmits a request to a presentation unit 512 (which will be described later with reference to FIG. 5) of the document management server 131, in response to the instruction of the job management unit 401. A content of the request that is transmitted is a request for authentication processing, a request for uploading of scanned data, or the like. Also, the communication unit 402 receives a response (reply to the request) and a request from the presentation unit 512. A content of the request that is received is an instruction to execute printing or the like.

The job processing unit 403 causes the control unit 210 to execute scan processing in response to the scan execution instruction from the job management unit 401. As a result, the job processing unit 403 receives image data generated by the scanner 221 reading an image on a document, a document file transmitted from the terminal 102, and the like. Then, the job processing unit 403 stores the image data as scanned data in the storage 404, and notifies the job management unit 401 of completion of the processing. Also, the job processing unit 403 passes, in response to the printing execution instruction from the job management unit 401, PDL data received from the document management server 131 to the control unit 210, and causes the control unit 210 to execute printing processing. As a result, the printer 220 forms an image on a paper medium. Note that page description language (PDL) is data described in a language that can be interpreted by image processing apparatuses. Then, the job processing unit 403 notifies the job management unit 401 of completion of the processing.

The storage 404 stores the scanned data that was generated in the job processing unit 403 in accordance with the instruction of the job management unit 401, and the PDL data received from the document management server 131. Also, the storage 404 transmits the stored scanned data and PDL data to the job management unit 401.

5. Software Configuration of Terminal

Figure 13:
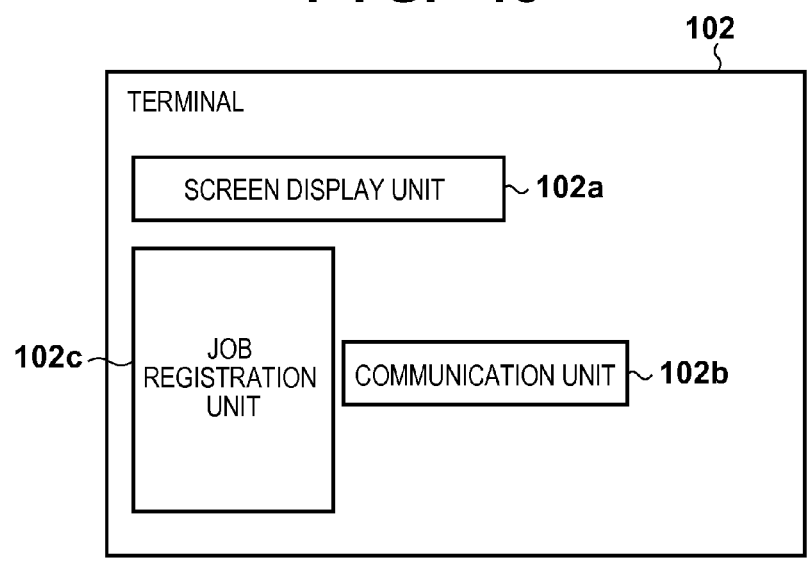
FIG. 13 is a diagram illustrating a software configuration of a terminal.

Next, a software configuration of the terminal 102 is described with reference to FIG. 13. Functional units illustrated in FIG. 13 are realized by a CPU 311 of each terminal 102 executing a control program. The terminal 102 includes a screen display unit 102a, a communication unit 102b, and a job registration unit 102c. The screen display unit 102a displays on a screen unit 330 a screen for executing jobs and, in response to an instruction from the user, instructs the job registration unit 102c to perform "document file registration", "printing", and the like. The screen display unit 102a also displays the results of various types of processing on the screen.

In response to the job execution instruction from the screen display unit 102a, the job registration unit 102c controls the communication unit 102b so as to execute jobs. The communication unit 102b transmits, in response to an instruction from the job registration unit 102c, a request to a presentation unit 512 (which will be described later with reference to FIG. 5) of the document management server 131. A content of the request that is transmitted is a request for authentication processing, a request for registering a document file, a request for printing a document file, or the like. Also, the communication unit 102b receives a response (reply to the request) from the presentation unit 512. A content of the request that is received is a notification of processing results, or the like.

6. Software Configuration of Document Management Server

Figure 5:
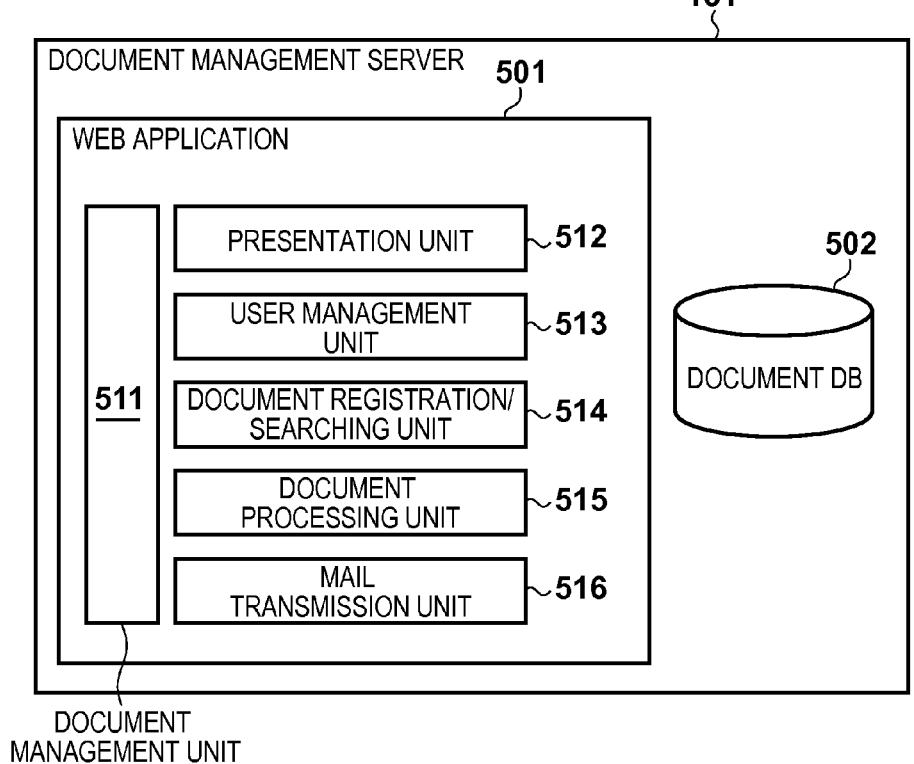
FIG. 5 is a diagram illustrating a software configuration of the document management server.

Next, a software configuration of the document management server 131 is described with reference to FIG. 5. Functional units illustrated in FIG. 5 are realized by the CPU 311 of each document management server 131 executing the control program. The document management server 131 includes a web application 501 and a document file base 502 (hereinafter abbreviated as document DB 502). The web application 501 includes a document management unit 511, a presentation unit 512, a user management unit 513, a document registration/searching unit 514, a document processing unit 515, and a mail transmission unit 516.

The document management unit 511 controls the processing units, that is, the presentation unit 512, the user management unit 513, the document registration/searching unit 514, the document processing unit 515, and the mail transmission unit 516 so as to execute various types of processing. For example, the document management unit 511 receives a request from the presentation unit 512, passes authentication information received from the image processing apparatus 101 to the user management unit 513, and causes the user management unit 513 to execute authentication processing. Also, the document management unit 511 causes the document processing unit 515 to process scanned data and data received from the terminal 102 such as a PC, and to register the data into the document DB 502. Further, the document management unit 511 can also notify the presentation unit 512 of the processing results, and instruct the mail transmission unit to notify a predetermined user of the processing results by e-mail.

The presentation unit 512 receives requests from the communication unit 402 of the image processing apparatus 101 and from the communication unit 102b of the terminal 102 such as a PC, and sends the request content to the document management unit 511. The presentation unit 512 further receives, from the document management unit 511, the results of processing performed in response to the request, generates response data to the request, and transmits the responses to the image processing apparatus 101 and the terminal 102. Examples of the request that is received include a request for authentication processing, a request for uploading electronic data into the document DB 502, and a print request to the image processing apparatus 101, and the processing at the time of the request will be described later.

The user management unit 513 manages user information. The user management unit 513 also executes, in response to an instruction from the document management unit 511, authentication processing based on the authentication information and user information that are obtained via the presentation unit 512, and notifies the document management unit 511 of the results.

The document registration/searching unit 514 registers, in response to an instruction from the document management unit 511, electronic data obtained via the presentation unit 512 into the document DB 502. Further, using an image feature amount (a detailed description thereof will be given later) of the received image data that is calculated in the document processing unit 515, the document registration/searching unit 514 searches the document DB 502 for a document file (original document file) that has the same feature amount as the image feature amount. Furthermore, using an image feature amount (a detailed description thereof will be given later) of the received document file that is calculated in the document processing unit 515, the document registration/searching unit 514 searches the document DB 502 for image data that has the same feature amount as the image feature amount. The document processing unit 515 executes, in response to an instruction from the document management unit 511, processing such as extraction of a document feature amount (a detailed description thereof will be given later) of the electronic data obtained via the presentation unit 512, and conversion of the electronic data into PDL data.

The mail transmission unit 516 provides a mail transmission and reception function using a protocol such as SMTP, POP, or IMAP. Note that SMTP is an abbreviation of "Simple Mail Transfer Protocol", POP is an abbreviation of "Post Office Protocol", and IMAP is an abbreviation of "Internet Message Access Protocol. The mail transmission unit 516 receives a destination address and the content of transmission from the document management unit 511, and transmits e-mail. The document DB 502 manages document information. Also, the document DB 502 executes, in response to an instruction of the web application 501, processing such as storing various types of electronic data (including scanned data) and extracting the stored electronic data.

Note that this example shows the case where one document management server 131 provides document management services (authentication processing, document processing, document registration/search processing, mail transmission processing, and the like). However, as another aspect of the document management server 131, a configuration is also possible in which a plurality of servers constitute functions, and a plurality of virtual machines are started among this group of servers, thereby executing distributed processing. In this case, a technology referred to as "scale-out" (cloud computing) in which the number of virtual machines is increased depending on a predetermined condition may be used.

7. User Information and Document Information

Figure 8:
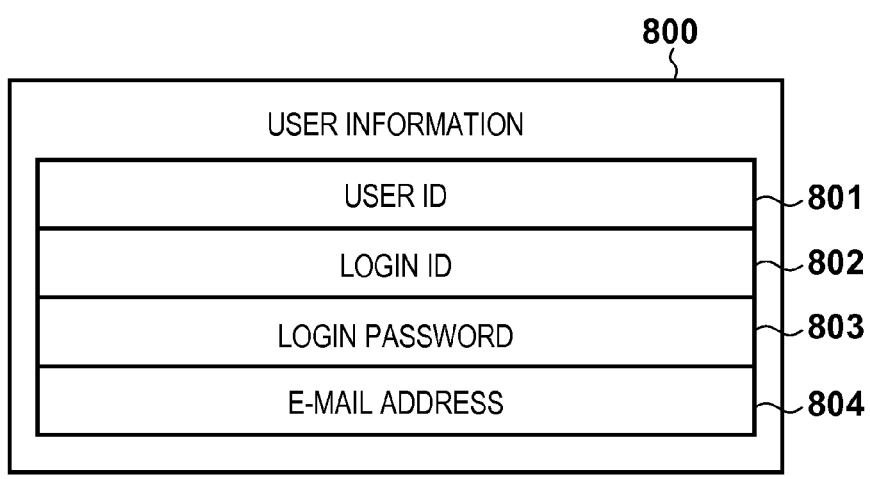
FIG. 8 is a diagram illustrating a data file format for storing user information managed by a user management unit.

Next, a data file format for storing user information managed by the user management unit 513 is described with reference to FIG. 8. The user information 800 includes a user ID 801, a login ID 802 for logging into the document management server 131, a login password 803 of the user, and an e-mail address 804 (unique destination assigned to the user). The information included in the user information 800 is managed in association with the user ID 801 that uniquely identifies the user. The number of pieces of user information 800 is equal to the number of users who are registered in the user management unit 513.

Figure 10:
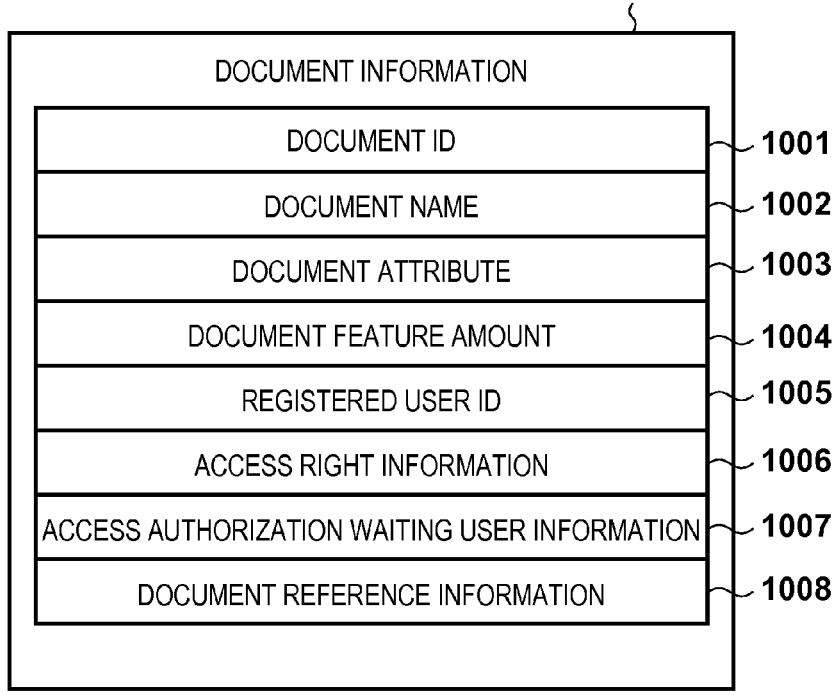
FIG. 10 is a diagram illustrating a data file format for storing document information managed by a document DB.

Next, a data file format for storing document information managed by the document DB 502 is described with reference to FIG. 10. The document information 1000 includes a document ID 1001, a document name 1002, a document attribute 1003, a document feature amount 1004, a registered user ID 1005, access right information 1006, access authorization waiting user information 1007, document reference information 1008, and the like. The information included in the document information 1000 is managed in association with the document ID 1001 that uniquely identifies a document.

In the document attribute 1003, as attribute information of a document file, one of the attributes "normal data" and "waiting data" (a detailed description will be given later) is stored. In the document feature amount 1004, as feature information of a document file, an image feature amount of a document file that is converted into image data is stored for each document page. In the registered user ID 1005, an identifier for identifying a user who has registered the document file into the document DB 502 is stored. In the access right information 1006, an identifier for identifying a user who is authorized to access the document file is stored. In the access authorization waiting user information 1007, an identifier for identifying a user who is waiting for being authorized to access the document file is stored. Also, the document file is managed in association with, but separate from, the document information. Therefore, the document information holds the document reference information 1008 for referencing this document file. However, a configuration is also possible in which the document file is held in the document information.

8. Scanning and Uploading Processing

Figure 6:
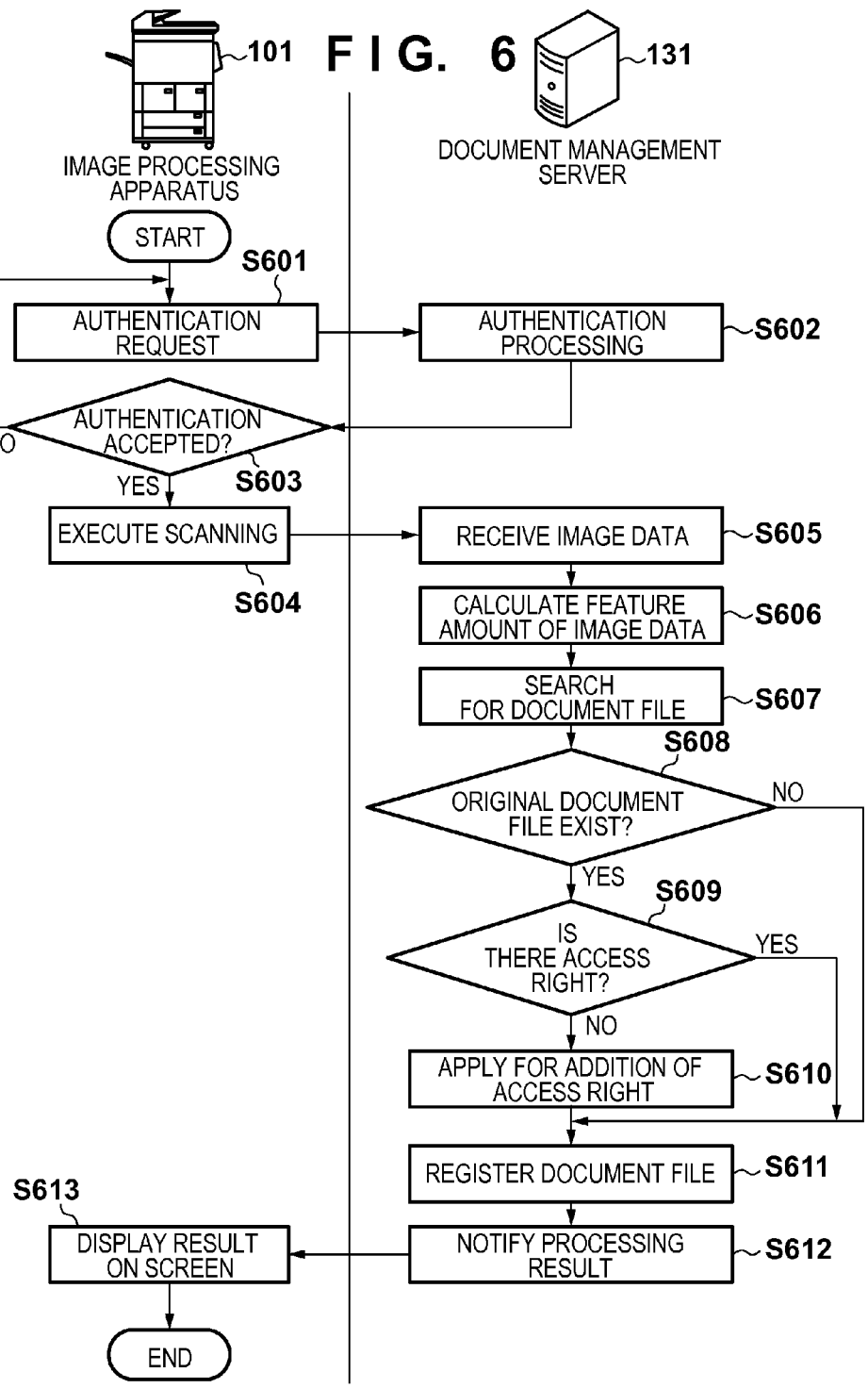
FIG. 6 is a flowchart illustrating scanning and uploading processing in an embodiment of the present invention.

Next, scanning and uploading processing in the present embodiment is described with reference to FIG. 6. Note that below-described processing performed by the image processing apparatus 101 is realized by the CPU 211 reading out the control program stored in the ROM 212 or the HDD 214 to the RAM 213, and executing the read control program. Also, processing performed by the document management server 131 is realized by the CPU 311 reading out the control program stored in the ROM 312 or the HDD 314 to the RAM 313, and executing the read control program.

Figure 7:
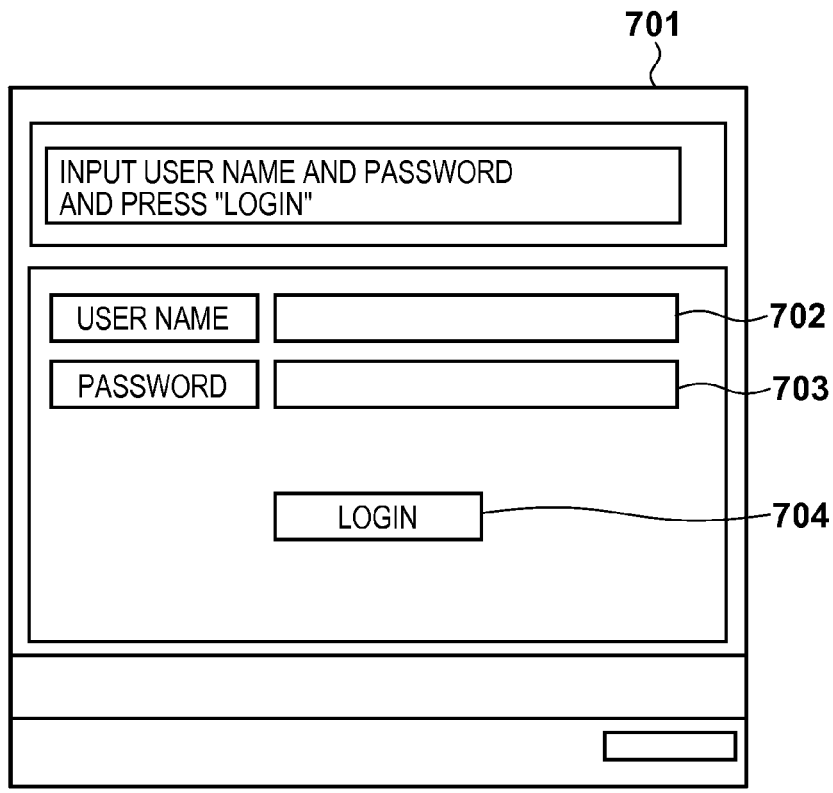
FIG. 7 is a diagram illustrating an example of a login screen for scanning and uploading.

In step S601, the screen display unit 400 displays a login screen that prompts a user to input authentication information on the liquid crystal screen of the operation unit 219. Hereinafter, an example of the login screen for the scanning and uploading processing is described with reference to FIG. 7. In a content display region 701, a user name input field 702, a password input field 703, and a login button 704 are displayed. A user (first user) of the image processing apparatus 101 can operate the operation unit 219 so as to input a user name in the user name input field 702 and a password in the password input field 703. When the login button 704 is pressed by the user, the screen display unit 400 passes the values (referred to as "authentication information") that have been input in the user name input field 702 and the password input field 703 to the job management unit 401. The job management unit 401 transmits the received authentication information and a request for authentication processing to the presentation unit 512 of the document management server 131 via the communication unit 402.

FIG. 6 is referenced again. In step S602, the presentation unit 512 that has received the authentication information and the request for authentication processing requests the document management unit 511 to execute authentication processing, and in response to the request, the document management unit 511 causes the user management unit 513 to execute the authentication processing. The user management unit 513 references the user information 800, and checks whether or not the received authentication information has already been registered. If the authentication information has already been registered, authentication is accepted, and if the authentication information has not been registered, authentication is rejected and the result is returned to the document management unit 511. The document management unit 511 transmits the result, as a response to the authentication request, to the communication unit 402 via the presentation unit 512.

Figure 9:
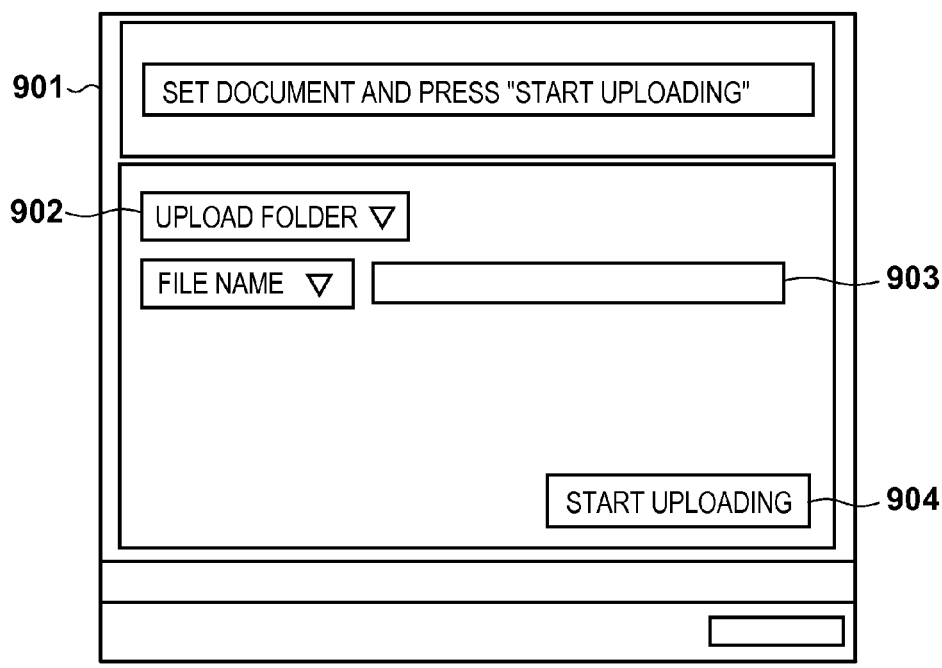
FIG. 9 is a diagram illustrating an example of a scan setting screen.

In step S603, if the result in step S602 is that authentication is accepted (Yes in step S603), the job management unit 401 shifts the procedure to step S604. If the result in step S602 is that authentication is rejected (No in step S603), the job management unit 401 causes the liquid crystal screen of the operation unit 219 to display a screen indicating authentication failure, and the procedure returns to step S601. In step S604 (that is, when the result in step S603 is that authentication is accepted), the screen display unit 400 displays, in response to an instruction of the job management unit 401, a scan setting screen that prompts the user of the image processing apparatus 101 to execute scan processing on the liquid crystal screen of the operation unit 219. Hereinafter, an example of the scan setting screen is described with reference to FIG. 9. In a content display region 901, an upload folder selection button 902, a file name input field 903, and an upload start button 904 are displayed.

When the user of the image processing apparatus 101 presses the upload folder selection button 902, a file configuration of the document management server 131 is displayed and the user selects a folder in which the scanned data is to be uploaded. By inputting a file name in the file name input field 903, the user of the image processing apparatus 101 determines the file name that is to be uploaded to the document management server 131.

When the upload start button 904 is pressed, the screen display unit 400 passes the values (referred to as "job information") that have been selected using the upload folder selection button 902 and input in the file name input field 903 to the job management unit 401. Next, in response to a scan execution instruction from the job management unit 401, the job processing unit 403 causes the control unit 210 to execute scan processing. As a result, the job processing unit 403 receives image data generated by the scanner 221 reading an image on a document. Then, the job processing unit 403 stores the image data as scanned data into the storage 404 of the image processing apparatus 101, and notifies the job management unit 401 of completion of the processing. The job management unit 401 that has been notified transmits, together with the scanned data stored in the storage 404 of the image processing apparatus 101 and the job information (the upload folder and the file name), a request for upload processing to the presentation unit 512 via the communication unit 402.

FIG. 6 is referenced again. In step S605, the presentation unit 512 receives the request for upload processing together with the scanned data and the job information (the upload folder and the file name), and requests the document management unit 511 to execute upload processing. In step S606, the document management unit 511 causes the document processing unit 515 to analyze the received scanned data (image data) and to digitalize the data as an image feature amount. In the present embodiment, calculation of the image feature amount is performed by calculating a multidimensional value using luminance, edge information, color and the like of an image as parameters.

In step S607, the document management unit 511 passes the image feature amount of the scanned data calculated in step S606 to the document registration/searching unit 514, and causes the document registration/searching unit 514 to execute search processing. First, the document registration/searching unit 514 searches the document DB 502 for a document file (an original document file) that has the same image feature amount as that of the scanned data. Specifically, among document files managed in the document DB 502, the document registration/searching unit 514 searches for a document file whose document attribute 1003 is "normal data" and whose document feature amount 1004 has the same value as the image feature amount of the scanned data.

In step S608, the document management unit 511 determines the result of the search for the document file. If, as a result of step S607, the document file (original document file) exists (Yes in step S608), the procedure shifts to step S609. If the original document file does not exist (No in step S608), the procedure shifts to step S611. In step S609, the document management unit 511 determines whether or not a user ID 801 of the user (that is, the user who has executed scanning) who has logged in the document management server 131 is included in the access right information 1006 of the original document file. If it is determined that the user ID 801 of the user who has executed scanning is not included (No in step S609), it is determined that the user does not have an access right, and the procedure shifts to step S610. On the other hand, if it is determined that the user ID 801 of the user who has executed scanning is included (Yes in step S609), the user is determined to have an access right, and the procedure shifts to step S611.

In step S610, the document management unit 511 registers the user ID 801 of the logged-in user (that is, the user who has executed scanning) into the access authorization waiting user information 1007 of the original document file. Also, the document management unit 511 specifies a user who has the same user ID 801 as the registered user ID 1005, and causes the mail transmission unit 516 to transmit an e-mail to request access authorization to an e-mail address 804 of the specified user information 800. Accordingly, the registered user of the original document is notified of presence of the authorization request.

In step S611, the document management unit 511 registers, in the document DB 502, the scanned data into the upload folder received in step S605 with the file name received likewise in step S605. At that time, the file name received in step S605 is registered into the document name 1002, and the user ID 801 of the user (that is, the user who has executed scanning) who has logged into the document management server 131 is registered into the registered user ID 1005. Also, in the document information 1000, the image feature amount calculated in step S606 is stored in the document feature amount 1004, and reference information for referring to the place where the scanned data is held is stored in the document reference information 1008. Also, the document attribute 1003 is registered as "waiting data" if the last processing is step S608 or S610, or as "normal data" if the last processing is step S609.

In step S612, the document management unit 511 transmits the processing results until step S611, as a response to the upload request received in step S604, to the communication unit 402 of the image processing apparatus 101 via the presentation unit 512. Examples of a content of the response are as follows depending on the case.

1. In the case where an original document file exists and a user has an access right to this document (that is, Yes in step S609 and the document attribute 1003 is "normal data")

The response is the document information 1000 of the document file registered in step S611 and the document information 1000 of the original document file specified in step S607.

2. In the case where an original document file does not exist (that is, No in step S608 and the document attribute 1003 is "waiting data")

The response is the document information 1000 of the document file registered in step S611.

3. In the case where an original document file exists but a user does not have an access right (that is, No in step S609 and the document attribute 1003 is "waiting data")

The response is the document information 1000 of the document file registered in step S611, and information (registered user ID 1005) on the user who has registered the original document file.

In step S613, the job management unit 401 displays the content corresponding to the response in step S612 on the liquid crystal screen of the operation unit 219. Examples of the display content are as follows depending on the cases 1 to 3, which have been described with respect to step S612.

1. In the case where an original document file exists and a user has an access right to this document The document is uploaded to "storage location 1 of the document DB".

The original document file exists in "storage location 2 of the document DB" on the document management server.

Note that information of the document reference information 1008 on the registered document file is displayed at the "storage location 1 of the document DB", and information of the document reference information 1008 on the original document file is displayed at the "storage location 2 of the document DB".

2. In the case where an original document file does not exist

The document is uploaded to the "storage location of the document DB".

Note that information of the document reference information 1008 on the registered waiting data is displayed at the "storage location of the document DB".

3. In the case where an original document file exists but a user does not have an access right The document is uploaded to the "storage location of the document DB".

The original document file was found, but there is no access right.

Application for an access right is being processed for "user ID"

Note that information of the document reference information 1008 on the registered waiting data is displayed at the "storage location of the document DB", and the registered user ID 1005 of the original document file is displayed at the "user ID".

With the above-described procedures, the user who has executed scanning can obtain the original document file (or the storage location of the original document file) if the original document file of the scanned data exists on the document management server 131. If the original document file does not exist, the document is registered as "waiting data" into the document management server 131. Accordingly, if a corresponding original document file is registered in the document management server 131 in the future, the user who has executed scanning can be notified of the registration of the original document file (a detailed description will be given later).

9. Document Printing/Registration Processing

Figure 11:
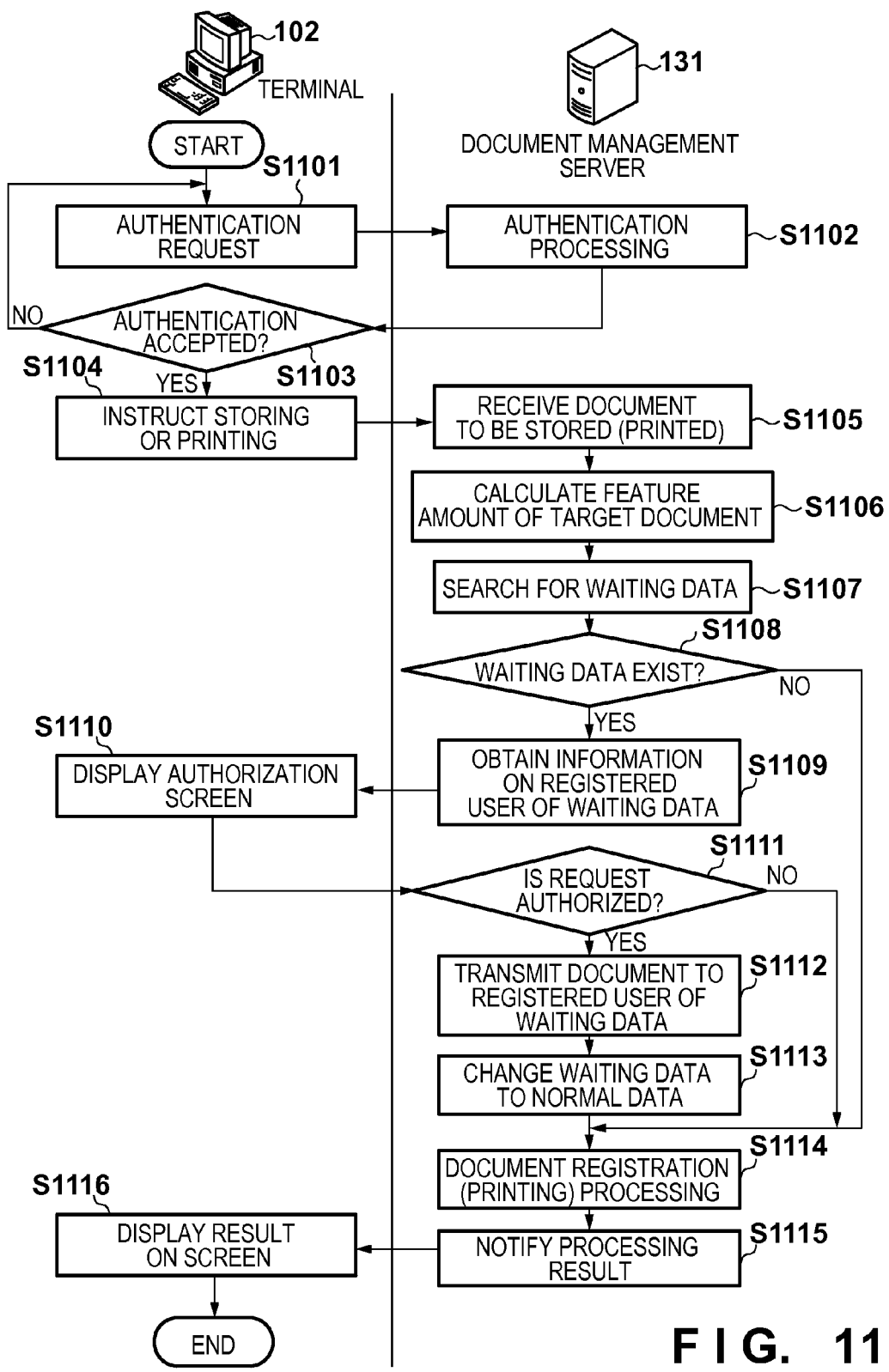
FIG. 11 is a flowchart illustrating processing for registering or printing a document file in an embodiment of the present invention.

Next, processing for registering or printing a document file in the present embodiment is described with reference to FIG. 11. In this processing, the user uses the terminal 102 to cause the document management server 131 to register the document file or to cause the image processing apparatus 101 to perform printing. Note that the below-described processing performed by the terminal 102 is realized by the CPU 211 reading out the control program stored in the ROM 212 or the HDD 214 to the RAM 213, and executing the control program. Also, the processing performed by the document management server 131 is realized by the CPU 311 reading out the control program stored in the ROM 312 or the HDD 314 to the RAM 313, and executing the control program.

In step S1101, the screen display unit 102a of the terminal 102 displays a login screen that prompts the user to input authentication information on the screen unit 330. The login screen is similar to that illustrated in FIG. 7, and a description of contents common to those of the above-description will be omitted.

A user (second user) of the terminal 102 can operate the operation unit 320 so as to input a user name in the input user name input field 702 and a password in the password input field 703. When the login button 704 is pressed by the user, the screen display unit 102a passes the values (referred to as authentication information) that were input in the user name input field 702 and the password input field 703 to the job registration unit 102c. The job registration unit 102c transmits the received authentication information and a request for authentication processing to the presentation unit 512 of the document management server 131 via the communication unit 102b.

In step S1102, the presentation unit 512 that has received the authentication information and the request for authentication processing requests the document management unit 511 to execute authentication processing, and in response to the request, the document management unit 511 causes the user management unit 513 to execute the authentication processing. The user management unit 513 references the user information 800, and checks whether or not the received authentication information has already been registered. If the authentication information has already been registered, authentication is accepted, and if the authentication information has not yet been registered, authentication is rejected and the result is returned to the document management unit 511. The document management unit 511 transmits the result, as a response to the authentication request, to the communication unit 102b via the presentation unit 512.

In step S1103, if the result in step S602 is that authentication is accepted (Yes in step S1103), the job registration unit 102c shifts the procedure to step S1104. If the result is that authentication is rejected (No in step S1103), a screen indicating authentication failure is displayed on the screen unit 330, and the procedure returns to step S1101.

In step S1104 (that is, when the result in step S1103 is that authentication is accepted), the screen display unit 102a displays, in response to an instruction of the job registration unit 102c, a setting screen that prompts the user of the terminal 102 to execute registration or printing of the document on the screen unit 330.

Figure 12:
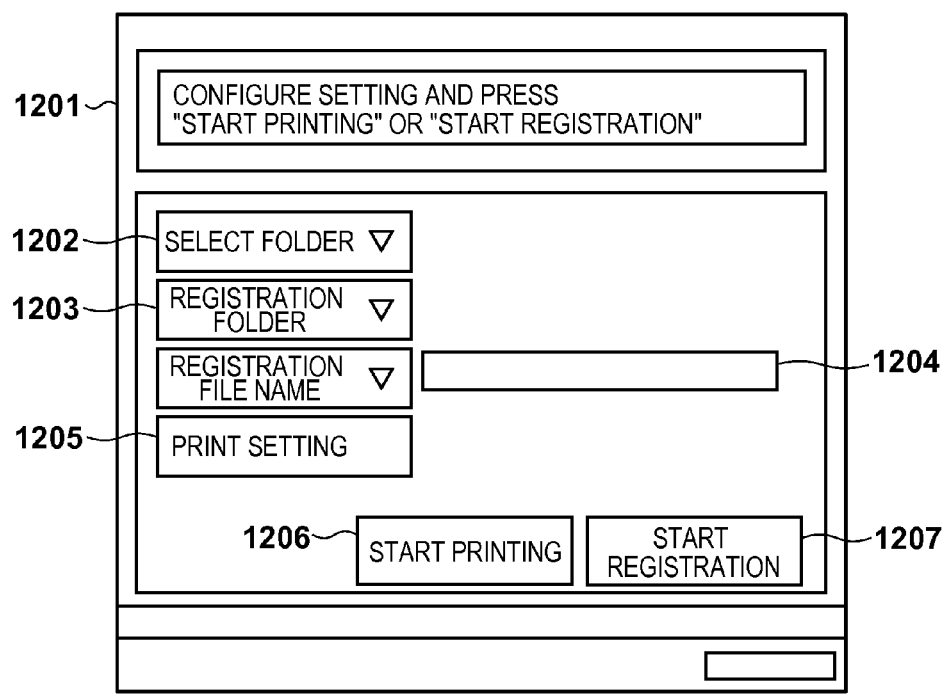
FIG. 12 is a diagram illustrating an example of a document registration/printing setting screen.

Hereinafter, an example of the document registration/printing setting screen is described with reference to FIG. 12. In a content display region 1201, a file selection button 1202, a registration folder selection button 1203, a file name input field 1204, a print setting button 1205, a printing start button 1206, and a registration start button 1207 are displayed.

When the user of the terminal 102 presses the file selection button 1202, a file configuration of the terminal 102 is displayed, and the user selects a document file that is to be registered in the document management server 131 or a document file that is to be printed. When the user of the terminal 102 presses the registration folder selection button 1203, a file configuration of the document management server 131 is displayed, and the user selects a folder in which the document file is to be registered. By inputting a file name in the file name input field 1204, the user of the terminal 102 determines the file name that is to be uploaded to the document management server 131. When the user of the terminal 102 presses the print setting button 1205, a screen (not shown) for configuring various types of print settings such as output sheet size, printing method (one-side printing or duplex printing), and the like is displayed on the screen unit 330. By operating the operation unit 320 and inputting print settings, the user of the terminal 102 determines the print settings.

When the user of the terminal 102 presses the printing start button 1206, the job registration unit 102c transmits, together with the document file that has been input using the file selection button 1202 and the print settings, a request for printing processing to the presentation unit 512 via the communication unit 102b. When the user of the terminal 102 presses the registration start button 1207, the job registration unit 102c transmits, together with the input document file and the registration information (the registration folder, and file name), a request for document registration processing to the presentation unit 512 via the communication unit 102b. Note that in the present embodiment, the printing processing and the registration processing are handled as separate processes, but it is possible to execute both processes (the document registration and the document printing) at the same time.

FIG. 11 is referenced again. In step S1105, the presentation unit 512 receives the request for document printing processing (or document registration processing) together with the document file and the print settings (or registration information), and requests the document management unit 511 to execute document printing processing (or document registration processing).

In step S1106, the document management unit 511 causes the document processing unit 515 to analyze the received document file and digitalize the document file as an image feature amount. The image feature amount is calculated by converting the document file into image data. In the present embodiment, as a method for converting a document file into image data, a printer driver type image generating driver is used. The document processing unit 515 controls an application that can recognize the document file and has a print function so as to cause the image generating driver to start printing, and obtains output of a desired image. Also, a method described with respect to step S606 is used for the calculation of the image feature amount.

In step S1107, the document management unit 511 passes the image feature amount of the document file calculated in step S1106 to the document registration/searching unit 514, and causes the document registration/searching unit 514 to execute search processing. First, the document registration/searching unit 514 searches the document DB 502 for waiting data (image data) that has the same image feature amount as that of the document file. Specifically, the document registration/searching unit 514 searches for scanned data whose document attribute 1003 is "waiting data" and whose document feature amount 1004 has the same value as the image feature amount of the document file, from among document files managed in the document DB 502.

In step S1108, the document management unit 511 determines the result of the search for the scanned data. If, as a result of step S1107, corresponding waiting data (scanned data) exists (Yes in step S1108), the procedure shifts to step S1109. If corresponding waiting data does not exist (No in S1108), the procedure shifts to step S1114.

In step S1109, the document management unit 511 by referencing the registered user ID 1005 of the waiting data that has been determined to have the same image feature amount as that of the original document file, specifies the registered user of the waiting data. Then, the document management unit 511 transmits the registered user ID 1005 of the waiting data, as a response to the request for document registration processing (or the request for printing processing) that has been received in the communication unit 102b in step S1105, via the presentation unit 512.

In step S1110, the screen display unit 102a displays, on the screen unit 330, the registered user ID 1005 of the waiting data that has been received by the communication unit 102b. Further, the screen display unit 102a displays, on the screen unit 330, an authorization screen (not shown) that allows the user of the terminal 102 to select whether or not to provide the document file as an original document file to the user who has registered the waiting data. Then, the user of the terminal 102 presses an authorization button or a rejection button. Then, the screen display unit 102a passes the information relating to whether to authorize or reject the provision to the job registration unit 102c. The job registration unit 102c transmits, together with the received information, a request for authorization processing to the presentation unit 512 via the communication unit 102b.

In step S1111, the presentation unit 512 that has received the request for authorization processing from the job registration unit 102c requests the document management unit 511 to execute authorization processing. The document management unit 511 determines whether the received request shows that the provision is authorized or rejected. If the received request shows that the provision is authorized (yes in step S1111), the procedure shifts to step S1112, and if the received request shows that the provision is rejected (No in step S1111), the procedure shifts to step S1114.

In step S1112, the document management unit 511 causes the mail transmission unit 516 to transmit an e-mail to which the original document file is attached to the e-mail address 804 of the registered user of the waiting data who has been specified in step S1109. Accordingly, the original document file is provided to the registered user of the waiting data.

In step S1113, the document management unit 511 changes the document attribute 1003 of the waiting data that is found in step S1107 from "waiting data" to "normal data". This is because the user who has registered the waiting data was able to obtain the desired original document file in step S1112, and thus the original document file does not need to be registered as waiting data.

In step S1114, the document management unit 511 executes processing in accordance with the request received in step S1105. If the received request is a request for document registration processing, the document management unit 511 stores, in the document management DB 502, the document file in the registration folder received in step S1105 with the file name received likewise in step S1105, as "normal data". Also, at that time, the file name received in step S1105 is stored in the document name 1002, an attribute "normal data" is stored in the document attribute 1003, and the user ID 801 of the user (that is, a document registration job executing user) who logged into the document management server 131 is stored in the registered user ID 1005. Further, in the document information 1000, the image feature amount calculated in step S1106 is stored in the document feature amount 1004, and reference information for referring to a location where the document file is held is stored in the document reference information 1008. Also, when an e-mail was transmitted in step S1112, the user ID 801 of the registered user of the authorized waiting data is also added to the access right information 1006.

On the other hand, if the received request is a request for printing processing, the document management unit 511 causes the document processing unit 515 to convert the document file into data (PDL) that can be recognized by the image processing apparatus. In the present embodiment, the conversion of the document file into PDL data is performed by controlling the application so as to cause the printer driver provided for the image processing apparatus 101 to start printing. The document management unit 511 transmits a request for printing the PDL data, together with the print settings received in step S1105, to image processing apparatus 101. The image processing apparatus 101 that has received the request for printing executes printing processing and performs the final paper output.

In step S1115, the document management unit 511 transmits the processing results until step S1114, as a response to the requests received in steps S1105 and S1110, to the communication unit 102b of the terminal 102 (via the presentation unit 512). Examples of contents of the response are as follows depending on the type of request.

1. In the Case of a Request for Document Registration

The document information 1000 of the document file registered in step S1114 is transmitted as a response.

2. In the Case of a Request for Document Printing

A message indicating that the document file has been printed is transmitted as a response.

In step S1116, the screen display unit 102a displays the result received by the communication unit 102b on the screen unit 330. In the above-described cases 1 and 2, the following messages, for example, are respectively displayed on the screen unit 330.

1. In the Case of a Request for Document Registration

The document file has been registered in the "storage location of the document DB".

Note that information of the document reference information 1008 on the original document file is displayed at the "storage location of the document DB".

2. In the Case of a Request for Document Printing

The document file has been output from the printer.

With the above-described procedures, the job executing user can register the document file into the document management server 131 or cause the image processing apparatus 101 to print the document file. Also, in the case where a scan executing user has registered the document file as waiting data in the document management server 131, the document management server 131 can provide the original document file to the scan executing user.

10. Original Document File Authorization Processing

Figure 14:
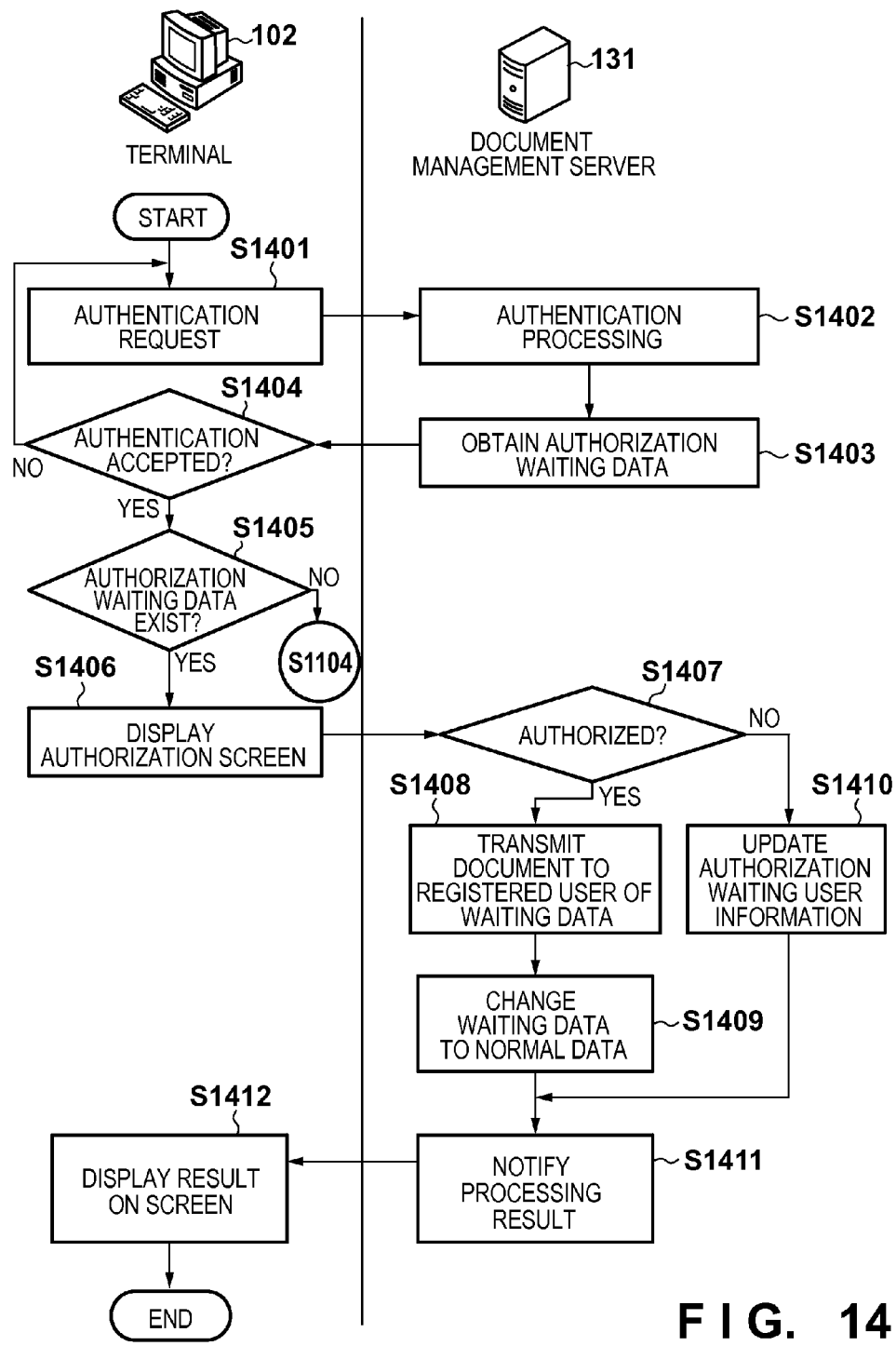
FIG. 14 is a flowchart illustrating authorization processing for authorizing an access to an access authorization waiting document file in the present embodiment.

Next, authorization processing for authorizing access to an access authorization waiting document file (with regard to the access authorization waiting document, see step S610 of the flowchart of the scanning and uploading processing) in the present embodiment is described with reference to FIG. 14. Note that the below described processing performed by the terminal 102 is realized by the CPU 211 reading out the control program stored in the ROM 212 or the HDD 214 to the RAM 213, and executing the control program. Also, the processing performed by the document management server 131 is realized by the CPU 311 reading out the control program stored in the ROM 312 or the HDD 314 to the RAM 313 and executing the control program.

In step S1401, the terminal 102 makes a request for authentication processing. The processing has the same contents as those in step S1101, and therefore a description thereof is omitted.

In step S1402, the document management server 131 executes authentication processing. This processing differs from the processing in step S1102 in that the processing in step S1403 is executed before the result of the authentication processing is transmitted to the communication unit 102b as a response to the authentication request.

In step S1403, the document management unit 511 searches for an access authorization waiting document file among the document files that have been registered in the document DB 502 by the user of the terminal 102. Specifically, the document management unit 511 searches for a document file whose user ID is registered in the access authorization waiting user information 1007. If the access authorization waiting document file is present, the document information 1000 on this document file is obtained. Then, the document management unit 511 transmits the results of the authentication processing in step S1402 and the document information 1000, as a response to the authentication request, to the communication unit 102b via the presentation unit 512.

In step S1404, if the authentication is accepted, the job registration unit 102c shifts the procedure to step S1405. If the authentication is rejected, a screen indicating the authentication failure is displayed on the screen unit 330, and the procedure returns to step S1401.

In step S1405, if an authorization waiting user is present (if the document information 1000 exists in the response received in step S1404), the job registration unit 102c shifts the procedure to step S1406. If the authorization waiting user is not present, the job registration unit 102c shifts the procedure to the document printing/registration processing (FIG. 11) in step S1104.

In step S1406, the screen display unit 102a displays the document ID 1001, the document name 1002, the access authorization waiting user information 1007, and the like of the received document information 1000 on the screen unit 330. Further, the screen display unit 102a displays, on the screen unit 330, the authorization screen (not shown) that allows the user of the terminal 102 to select whether or not to provide the document file as an original document file to the registered user (the user who has been registered in the access authorization waiting user information 1007) of the waiting data. Then, the user of the terminal 102 presses the authorization button or the reject button. Then, the screen display unit 102a passes the information relating to whether to authorize or reject the provision to the job registration unit 102c. The job registration unit 102c transmits the received information and a request for authorization processing to the presentation unit 512 of the document management server 131 via the communication unit 102b.

In step S1407, the presentation unit 512 that has received the request for authorization processing requests the document management unit 511 to execute authorization processing. The document management unit 511 determines whether the received request is accepted or rejected, and if the user of the terminal 102 has pressed the authorization button in step S1406, the procedure shifts to step S1408, and if the user of the terminal 102 has pressed the rejection button, the procedure shifts to step S1410.

In step S1408, the document management unit 511 adds the user ID of the registered user of the waiting data that has been authorized in step S1407 to the access right information 1006 of the original document file, and deletes the user ID of this registered user from the access authorization waiting user information 1007. Also, the document management unit 511 causes the mail transmission unit 516 to transmit an e-mail to which the original document file is attached to the e-mail address 804 of the registered user of the waiting data. Accordingly, the original document file is provided to the registered user of the waiting data.

In step S1409, the document management unit 511 changes the document attribute 1003 of the authorized waiting data from "waiting data" to "normal data". This is because the registered user of the authorized waiting data was able to obtain the desired original document file and thus the data does not need to be registered as waiting data.

On the other hand, in step S1410, the document management unit 511 deletes the user ID of the registered user of the waiting data that has been rejected in step S1407, from the access authorization waiting user information 1007 of the original document file. Also, the document management unit 511 causes the mail transmission unit 516 to transmit an e-mail indicating that the original document file will not be provided to the e-mail address 804 of the registered user of the waiting data. Accordingly, the registered user of the waiting data can recognize that the access right adding request has been rejected.

In step S1411, the document management unit 511 transmits the processing results until step S1410, as a response to the request that was received in step S1407, to the communication unit 102b of the terminal 102 via the presentation unit 512.

In step S1412, the screen display unit 102a displays the results received by the communication unit 102b on the screen unit 330. For example, "Document xxx has been provided as an original document file to the user xx" or the like is displayed.

With the above-described procedures, the user who has the access authorization waiting document file can provide the original document file to the user who has the waiting data.

11. Other Embodiments

The above-described embodiment has a configuration in which each time the user of the image processing apparatus 101 executes scanning, generated image data is transmitted to the document management server 131. However, the present invention is not limited to this, and a configuration is also possible such that the generated image data is stored in the RAM 213 or the like of the image processing apparatus 101, and transmitted to the document management server in response to an instruction of the user.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and function.

This application claims the benefit of Japanese Patent Application No. 2012-185764 filed on Aug. 24, 2012, which is hereby incorporated by reference herein in its entirety.

What is claimed is:

1. A document management apparatus comprising a memory and a processor cooperating to function as units comprising:
    an image data reception unit configured to receive image data generated in an image processing apparatus which is operated by a first user;
    a first obtaining unit configured to obtain a feature amount of the image data by analyzing the image data received by the image data reception unit;
    a first search unit configured to, when the image data reception unit receives the image data, search for a document file corresponding to the obtained feature amount of the image data;
    a storage unit configured to, when the image data reception unit receives the image data, (a) store information of the image data as waiting data if the document file corresponding to the obtained feature amount of the image data is not found by the first search unit, and (b) not store the information of the image data as the waiting data if the document file corresponding to the image data is found by the first search unit, wherein the information of the image data includes the obtained feature amount and identification information for identifying the first user;
    a first notification unit configured to, when the image data reception unit receives the image data, notify the first user of (i) the information of the image data and (ii) a search result from the first search unit;
    a document file reception unit configured to receive a new document file transmitted from a user terminal which is operated by a second user;
    a second obtaining unit configured to obtain a feature amount of the new document file received by the document file reception unit;
    a second search unit configured to, when the document file reception unit receives the new document file, search the storage unit for the waiting data corresponding to the obtained feature amount of the new document file received by the document file reception unit;
    a determination unit configured to, if the waiting data corresponding to the obtained feature amount of the new document file is found by the second search unit when the document file reception unit receives the new document file, determine, based on an operation on the user terminal, whether or not information corresponding to the new document file received by the document file reception unit is to be transmitted to the first user; and
    a second notification unit configured to, when the document file reception unit receives the new document file, notify the first user, who is identified by the identification information corresponding to the waiting data that was searched for by the second search unit, of the information corresponding to the new document file received by the document file reception unit, if the determination unit determines that the information corresponding to the new document file is to be transmitted,
    wherein the second notification unit does not notify the first user of the information corresponding to the new document file if the determination unit determines that the information corresponding to the new document file is not to be transmitted.

2. The document management apparatus according to claim 1, wherein, when the document file reception unit receives the new document file, the second notification unit transmits the new document file to the first user if the determination unit determines that the information corresponding to the new document file is to be transmitted.

3. A computer-implemented method for controlling a document management apparatus, the method comprising:
    a first reception step of receiving image data generated in an image processing apparatus which is operated by a first user;
    a first obtaining step of obtaining, by using a computer system, a feature amount of the image data by analyzing the image data received in the first reception step;
    a first search step of, when the image data is received in the first reception step, searching for a document file corresponding to the obtained feature amount of the image data;
    a first storing step of, when the image data is received in the first reception step, storing, in a storage unit, information of the image data as waiting data if the document file corresponding to the obtained feature amount of the image data is not found in the first search step, wherein (1) the information of the image data as the waiting data is not stored if the document file corresponding to the image data is found in the first search step and (2) the information of the image data includes the obtained feature amount and identification information for identifying the first user;

a first notification step of, when the image data is received in the first reception step, notifying the first user of (i) the information of the image data and (ii) a search result of the first search step;

a second reception step of receiving a new document file transmitted from a user terminal which is operated by a second user;

a second obtaining step of obtaining a feature amount of the new document file received in the second reception step;

a second search step of, when the new document file is received in the second reception step, searching the storage unit for the waiting data corresponding to the obtained feature amount of the new document file received in the second reception step;

a determination step of, if the waiting data corresponding to the obtained feature amount of the new document file is found in the second search step when the new document file is received in the second reception step, determining, based on an operation on the user terminal, whether or not information corresponding to the new document file received in the second reception step is to be transmitted to the first user; and a second notification step of, when the new document file is received in the second reception step, notifying the first user, who is identified by the identification information corresponding to the waiting data that was searched for in the second search step, of the information corresponding to the new document file received in the second reception step, if a determination is made, in the determination step, that the information corresponding to the new document file is to be transmitted, wherein the first user is not notified of the information corresponding to the new document file in the second notification ster if a determination is made, in the determination ster, that the information corresponding to the new document file is not to be transmitted.

4. The method according to claim 3, wherein, when the new document file is received in the second reception step, the new document file is transmitted, in the second notification step, to the first user if a determination is made, in the determination step, that the information corresponding to the new document file is to be transmitted.

5. A non-transitory computer-readable storage medium storing a computer program for causing a computer to function as units comprising:

an image data reception unit configured to receive image data generated in an image processing apparatus which is operated by a first user;

a first obtaining unit configured to obtain a feature amount of the image data by analyzing the image data received by the image data reception unit;

a first search unit configured to, when the image data reception unit receives the image data, search for a document file corresponding to the obtained feature amount of the image data;

a storage unit configured to, when the image data reception unit receives the image data, (a) store information of the image data as waiting data if the document file corresponding to the obtained feature amount of the image data is not found by the first search unit, and (b) not store the information of the image data as the waiting data if the document file corresponding to the image data is found by the first search unit, wherein the information of the image data includes the obtained feature amount and identification information for identifying the first user;

a first notification unit configured to, when the image data reception unit receives the image data, notify the first user of (i) the information of the image data and (ii) a search result from the first search unit;

a document file reception unit configured to receive a new document file transmitted from a user terminal which is operated by a second user;

a second obtaining unit configured to obtain a feature amount of the new document file received by the document file reception unit;

a second search unit configured to, when the new document file reception unit receives the document file, search the storage unit for the waiting data corresponding to the obtained feature amount of the document file received by the new document file reception unit;

a determination unit configured to, if the waiting data corresponding to the obtained feature amount of the new document file is found by the second search unit when the document file reception unit receives the new document file, determine, based on an operation on the user terminal, whether or not information corresponding to the new document file received by the document file reception unit is to be transmitted to the first user; and a second notification unit configured to, when the document file reception unit receives the new document file, notify the first user, who is identified by the identification information corresponding to the waiting data that was searched for by the second search unit, of the information corresponding to the document file received by the document file reception unit if the determination unit determines that the information corresponding to the new document file is to be transmitted, wherein the second notification unit does not notify the first user of the information corresponding to the new document file if the determination unit determines that the information corresponding to the new document file is not to be transmitted.

* * * * *